J. W. CRUIKSHANK.
APPARATUS FOR ANNEALING GLASS.
APPLICATION FILED DEC. 20, 1917.
1,313,222.
Patented Aug. 12, 1919.
2 SHEETS—SHEET 1.
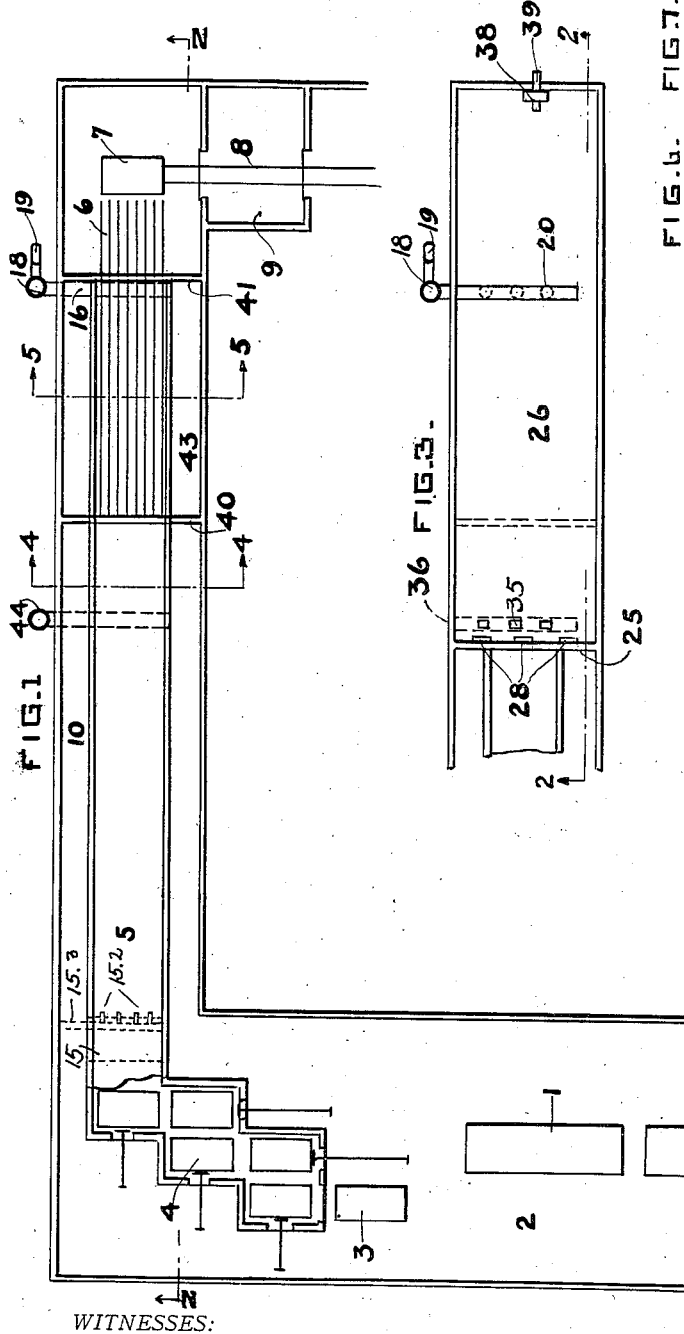
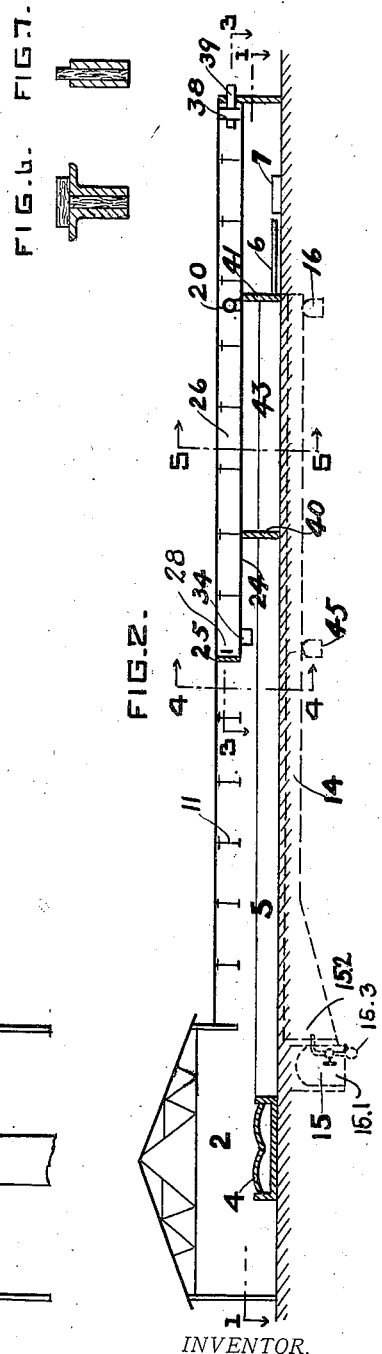
WITNESSES:
INVENTOR.

J. W. CRUIKSHANK.
APPARATUS FOR ANNEALING GLASS.
APPLICATION FILED DEC. 20, 1917.
1,313,222.
Patented Aug. 12, 1919.
2 SHEETS—SHEET 2.
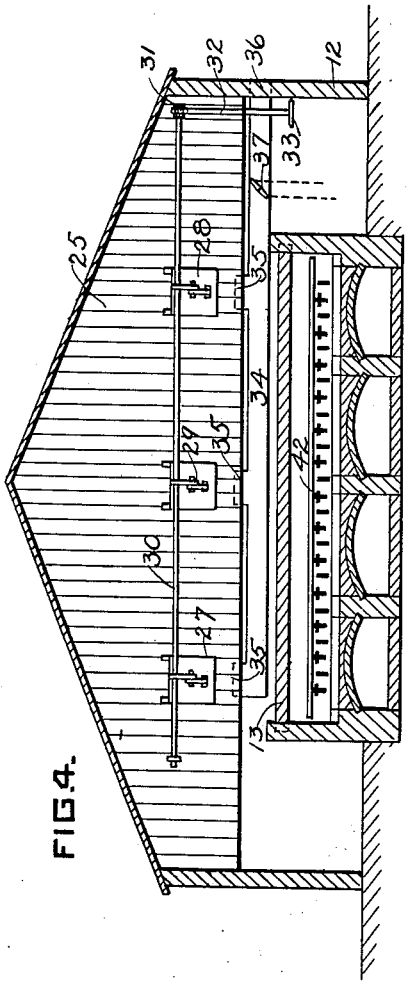
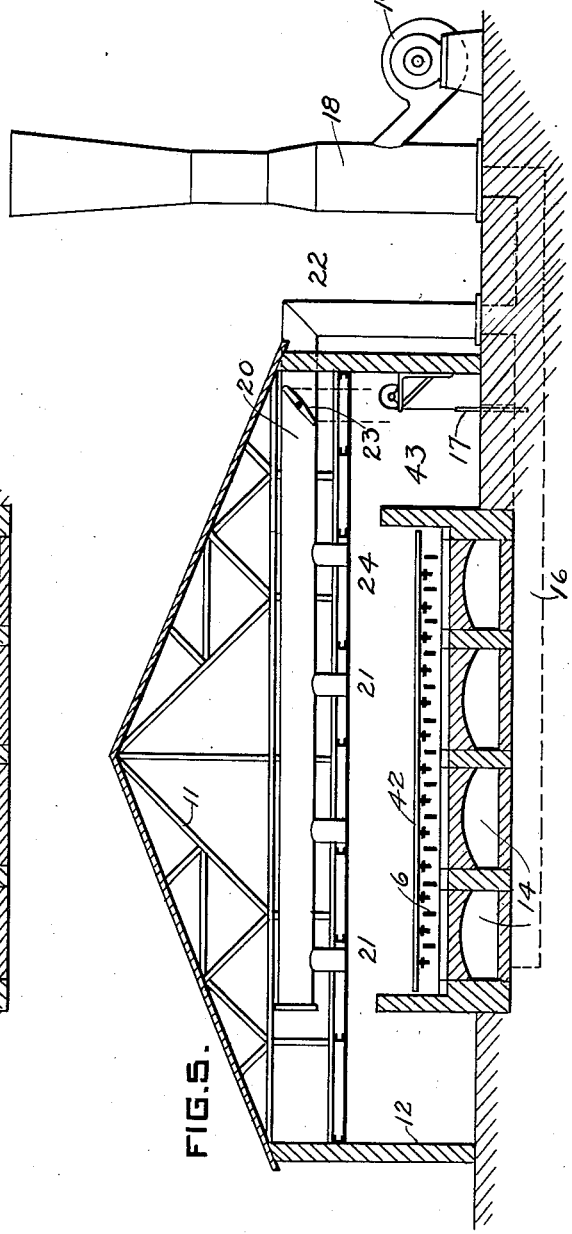
INVENTOR

UNITED STATES PATENT OFFICE.

JAMES W. CRUIKSHANK, OF PITTSBURGH, PENNSYLVANIA, ASSIGNOR TO J. W. CRUIKSHANK ENGINEERING COMPANY, OF PITTSBURGH, PENNSYLVANIA.

APPARATUS FOR ANNEALING GLASS.

1,313,222.   Specification of Letters Patent.   Patented Aug. 12, 1919.

Application filed December 20, 1917. Serial No. 208,103.

*To all whom it may concern:*

Be it known that I, JAMES W. CRUIKSHANK, citizen of the United States, resident of Pittsburgh, county of Allegheny, and State of Pennsylvania, have invented certain new and useful Improvements in and Apparatus for Annealing Glass, of which the following is a full, clear, and exact description, reference being had to the accompanying drawings, forming part of this specification.

My invention relates to improvements in plate glass annealing leers for the better cooling of the sheets. Heretofore difficulty has been experienced in bringing the sheets out of the delivery end of the leer at a sufficiently low temperature so that when exposed to cold air drafts breakage will not occur especially in winter. Attempts have been made to accomplish the desired result by making the leer runway of extreme length with the corresponding disadvantages of additional expense for construction, increased length of rods and possible resulting disarrangement of the machinery. This increase in length is impracticable in most factories on account of the space required, moreover the glass during its passage through the leer runway after it has been cooled below a certain temperature will radiate its heat very slowly so that even if the length of the leer is increased the desired results are not obtained and the advantage of the continuation of the length of the runway will not reduce the temperature to an appreciable extent commensurate with the disadvantages.

The sheets of glass are moved forward in the leer runway by that type of conveyer where the alternate pulling of the traveling rods and the raising of the fixed supporting rods which allow the traveling rods to be returned to position for another draw. These draws are at regular intervals and for practical purposes the width of the sheet, each sheet being advanced one place as a sheet is drawn. The width of the sheet determines the length of the runway, it being the usual practice to construct it to contain a fixed number of sheets so that its length will vary as the width of the sheet.

A rapid cooling due to the comparatively large difference of temperature between the plates and the walls and roof of the leer runway takes place at the hot end of the leer, and heat has to be supplied to prevent too rapid cooling, but as the sheets advance the cooling becomes comparatively slow, the resulting curve showing the cooling effect, being on parabolic lines and becoming nearly parallel with the abscissa as the length of the leer runway is increased. This fact is obvious from the well known law of radiation which varies as $T^4 - t^4$ where T represents the absolute temperature of the surface of the heated object and $t$ the absolute temperature of the surrounding surfaces which receive the radiated heat. It is evident therefore that cooling by radiation will not produce results in the reduction of the temperature of the sheets to a point where they can leave the leer safely and be handled on the cutting table, more especially as heretofore it has been found necessary to draw heat down the flues under the runway to prevent the metal supporting rods on which the glass is carried from checking the sheet and causing small vents in it which will eventually develop into large cracks. Unless heated, these rods are at a lower temperature than the glass and absorb heat from it, thus causing these vents or cracks. To overcome this difficulty I provide a contact surface for the rods of asbestos or other nonconducting material. In order to produce a more rapid cooling of the glass sheets, I use the method of cooling by convection and allow access of air to the sheets at the lower end, by increasing the size of the leer runway or cooling chamber to the full size of the building containing the leer runway. By this method I allow a general circulation of air over and around the sheets, the air being cooled by contact with the walls and ceiling of the surrounding building.

Another object of my invention is to provide more constant temperature conditions in summer and winter. Heretofore there has been difficulty experienced in making the glass sufficiently cool in summer due to the higher temperature of the surrounding objects and breakage will occur in winter due to the lower temperature of the roof and walls in the building. I not only provide a recipient surface for radiation of approximately constant temperature in the ceiling of the building containing the leer, but also arrange for the control of the air current which at times have a tendency to pass up the leer toward the hot end, due to atmospheric conditions in the stack and adverse winds which cause drafts in the building. Usually the stack provided at the end of the leer to draw the heat down the leer runway is a natural draft which it is evident will not be effective, is unconstant and unreliable as it is far removed from the source of heat. It is therefore often necessary to cause a draft by supplying an auxiliary source of heat directly to the stack. In my apparatus I employ a special form of stack using a fan with means to produce a constant draft. This stack draws the gases, not only from the underflues when required, but also through the leer way itelf over the surface of the sheets in accordance with the usual practice. I use the induced draft stack for this purpose and lead the air toward the end of the leer so as to prevent back drafts of cold air up the leer way.

Referring to the drawings:

Figure 1 is a plan view of a plate glass annealing leer and part of a furnace hall, taken on section 1—1, Fig. 2.

Fig. 2 is a cross sectional elevation of the same on line 2—2, Figs. 1 and 3.

Fig. 3 is a horizontal section on line 3—3, Fig. 2.

Fig. 4 is a cross sectional elevation on line 4—4, Figs. 1 and 2.

Fig. 5 is a cross sectional view on line 5—5, Figs. 1 and 2, the stack being for convenience shown on the opposite side in this view to that in Figs. 1 and 3.

Figs. 6 and 7 are details of glass carrying rods.

The furnaces in which the glass is melted are represented by the numeral 1, 2 being the furnace hall building. 3 is the usual casting table and 4 the leer ovens in which are represented the outlines of plates of glass. The leer runway is designated by the numeral 5 terminating with carrying rods 6, shown in detail Figs. 6 and 7, projecting therefrom and leading to a transfer car 7 mounted on a track 8, which conveys the glass sheet into a vestibule chamber 9 and thence to the cutting tables.

The leer runway is inclosed in the building 10 with roof trusses 11 and walls 12. The leer runway is covered by the flat slab forming its roof 13, under the leer runway there are flues 14 connected to a cross sub flue 15 to give access to each separate flue and to the valves 15.1 for the regulation of the gas burners 15.2 supplied by gas from the pipe 15.3 to heat these flues. At the other end there is a cross flue 16 provided with a damper 17 running under the leer runway and connecting the longitudinal flues 14 to a stack 18, this stack being provided with a fan 19 for the purpose of inducing a positive draft therein. A flue 20 connects to the top of the leer runway through the chamber 43 by inlets 21 thence by the downtake 22 to the stack 18. Flue 20 is provided with a damper 23.

Across the full width of the leer building 10, a ceiling 24 is provided carried upon longitudinal channel irons. The ceiling commences toward the cool end of the leer way with a cross partition 25 built on the face of one of the trusses 11 and is continuous to the end of the building. The chamber formed by the ceiling and the roof of the building is designated by the numeral 26. The partition 25 has holes 27 provided with hinged damper doors 28 which are operated by a usual window operating device consisting of levers 29, a horizontal shaft 30, a gearing 31, a vertical shaft 32 and an operating hand wheel 33. Near the partition 25 a flue pipe 34 is provided having openings 35 into the chamber 26. The other end of this flue connects through the wall to the outside of the building with an opening 36. A damper 37 is provided to close the flue from the outside air. At the opposite end of the chamber 26 exhaust fan 38 is provided with outlet 39 to the outside of the building.

In line with partition 25 or preferably between that point and the end of the runway, a cross partition 40 is built around the leer, across the building to the sides and between the ceiling 24 and the roof of the leer 13, forming an air tight partition at this point in the building. At the end of the leer runway a similar partition 41 is constructed across the building up to its ceiling 24. Between these two partitions 40 and 41 the roof 13 of the leer is removed allowing free radiation from the sheet of glass designated by the numeral 42 to the ceiling 24 and free convection of air in this chamber designated by the numeral 43, formed by the walls 12 of the building, its ceiling 24 and the end partitions 40 and 41, it being understood that there is a slot in partition 41 above the rods 6 through which the glass can pass. A stack 44 is connected to flues 14 by a cross flue 45 at an intermediate point of the runway. Figs. 6 and 7 illustrate a preferred form of glass carrying rod consisting of bars with asbestos bolted between them and on their upper surface as fully described in my copending application Serial No. 163,056.

The use and operation of the apparatus as an auxiliary for cooling the glass at the end of the leer is as follows. The fan 38 is put in operation and draws the air through the chamber 26. The dampers 28 being open, the air entering through openings 27 will be warmed from the radiated heat from the upper end of the leer and by the air heated by the furnaces 1 in the furnace hall 2 which will be drawn through the leer building 10. In winter time this will maintain the temperature of the ceiling 24 at a higher temperature than that of the roof of the building 10 so that the heat from the glass will radiate to its surface which can be maintained at approximately the same temperature as the roof of the building would be in the summer time. In the warmer weather the dampers 28 are closed and the damper 37 to the intake pipe 34 is opened so that the air from the outside is taken into and through the chamber 26 thus cooling it and maintaining it at the approximate temperature of the outside air. In this way the surface to which the heat from the glass is radiated may be maintained at a constant temperature summer and winter.

The flue 20 which usually is connected with the leer runway by means of the intake pipes 21, in this case being connected to the ceiling 24 pulls the air from the hot end of the leer through the ovens down the runway and thence to the induced draft stack 18 where it is exhausted. This stack is used more especially for preparing the leer to receive the glass before casting and is shut down to a large extent when the leer is in operation. In the same manner the heat is drawn down the flues 14 under the runway through the cross flue 16 and thence to the stack 18. These flues are used to heat the runway before casting and to maintain a sub-heat so that the rods 6, carrying the glass will be heated to approximately the same temperature as the glass. This has heretofore been necessary as otherwise if the rods are at a lower temperature than the glass, the glass being in contact with them will be vented either causing small cracks or else starting a crack that will spread through the whole sheet and cause broken glass.

In order to obviate the necessity of heating the rods, I provide a surface on which the glass rests of a nonconducting material such as asbestos. By using rods as described the damper from the leer flues leading to the stack 18 may be almost entirely closed so that no heat passes down the bottom flues during the time of operation, it being immaterial if the rods are properly covered with a non-conducting material whether they are colder than the glass or not as they will not rapidly receive heat from it and therefore will not cause breakage.

Stack 44 can be advantageously used to heat up the rods and brick work under certain conditions, instead of drawing the heat to the extreme end of the leer by stack 18, thus giving more favorable conditions for cooling the glass at this end.

The vestibule 9 through which the car 7 passes carrying the sheet of glass is for the purpose of preventing a back draft of cold air from passing up through the chamber of the runway 42 by keeping one of the two doors at each end of it always closed.

It will be seen from the drawings that the ceiling 24 is carried over the leer runway toward the hot end over the roof covering 13 of the leer to a point on the leer runway where the temperature of the glass is greatly reduced to that temperature where it leaves the leer ovens. This portion of the runway covering will radiate its heat to the ceiling 24 and in turn have the heat from the glass radiated to it. The temperature of the recipient of the heat will make a material difference at this point on account of the cooler condition of the glass, nearer to the ovens a difference of temperature of some 100° F. in the heat recipient would not make much difference in the rate of cooling of the glass sheets which will be evident from considering the $T^4-t^4$ ratios, but where the temperature of the sheet is reduced to a comparatively low temperature, a difference corresponding to that of summer to winter conditions in the temperature of the heat recipient will make a considerable difference in the rate of radiation from the heated body.

From the partition wall 40 to the wall 41 at the end of the leer the roof covering of the runway is removed so that the heat will radiate directly from the glass sheet to the ceiling 24. The glass will also be cooled by air circulation in this chamber coming in contact with it and coming in contact with the ceiling and walls of the building which will in turn absorb the heat from the air. The cooling by air contact is more effective at the lower temperature than radiation and can be safely employed, provided that the surrounding air is not too cold. The temperature in the chamber 43 is regulated by the air and gases drawn down the runway by means of the stack 18 through the flue 20. The ceiling 24 is carried out over the chamber into which the glass enters after leaving the leer runway so that there is still further opportunity for keeping the glass at an even temperature after it leaves the leer and until it is conveyed to the room where it is cut and set in the racks.

Having thus described my invention, I claim:

1. In a plate glass annealing leer, the combination of a leer runway, a chamber in the building which contains the leer runway formed by the roof of the building and a ceiling, the ceiling having the function of being the receptive surface to which the heat from the glass is directly radiated for a portion of the runway, means to draw the heated air from the hotter end of the leer into the chamber through openings provided with controlling means, an alternate flue provided with a damper through which cooler air can be drawn into the chamber, means for exhausting and producing a current of air through said chamber.

2. In combination with a plate glass annealing leer an auxiliary cooling device comprising an enlarged cooling chamber, continuous with and communicating with the leer runway, formed by the walls and ceiling of the building and cross walls in the building containing the runway, means for regulating the temperature in the chamber.

3. In combination with a plate glass annealing leer an auxiliary cooling device comprising an enlarged cooling chamber, continuous with and communicating with the leer runway, formed by the walls and ceiling of the building and cross walls in the building containing the runway, means for regulating the temperature in the chamber, means for regulating the temperature of the external surfaces of the chamber.

4. In a plate glass annealing leer having an extended runway for cooling the glass, the combination of a building containing the runway having a ceiling which is a receptor for the radiated heat from the glass, and cross partition walls below the ceiling through which the leer runway passes forming separate chambers, means for regulating the temperatures progressively in the chambers.

5. In combination with a plate glass annealing leer an enlarged cooling chamber continuous with and communicating with the leer runway, formed by the walls and ceiling of the building and cross walls in the building containing the runway, having an appreciable drop in temperature, means to prevent unequal and rapid transference of heat to the carrying rods in the chamber by providing a material on their surface and in contact with the glass plate of relatively less conductivity than metal.

JAMES W. CRUIKSHANK.